United States Patent
Park et al.

(10) Patent No.: US 8,713,640 B2
(45) Date of Patent: Apr. 29, 2014

(54) SYSTEM AND METHOD FOR LOGICAL SEPARATION OF A SERVER BY USING CLIENT VIRTUALIZATION

(75) Inventors: Heean Park, Seoul (KR); Kyung Wan Kang, Seoul (KR); Kwang Tae Kim, Seoul (KR)

(73) Assignee: AHNLAB, Inc., Gyeonggi-Do (KR)

( * ) Notice: Subject to any disclaimer, the term of this patent is extended or adjusted under 35 U.S.C. 154(b) by 0 days.

(21) Appl. No.: 13/582,609

(22) PCT Filed: Mar. 4, 2011

(86) PCT No.: PCT/KR2011/001490
§ 371 (c)(1),
(2), (4) Date: Sep. 4, 2012

(87) PCT Pub. No.: WO2011/108877
PCT Pub. Date: Sep. 9, 2011

(65) Prior Publication Data
US 2012/0331522 A1 Dec. 27, 2012

(30) Foreign Application Priority Data
Mar. 5, 2010 (KR) .................. 10-2010-0019877

(51) Int. Cl.
*H04L 29/06* (2006.01)
(52) U.S. Cl.
USPC .............................. 726/3; 713/164; 713/165
(58) Field of Classification Search
None
See application file for complete search history.

(56) References Cited

U.S. PATENT DOCUMENTS

| | | | | |
|---|---|---|---|---|
| 7,228,434 | B2 * | 6/2007 | Zisowski | 713/187 |
| 7,461,148 | B1 * | 12/2008 | Beloussov et al. | 709/226 |
| 2002/0169987 | A1 * | 11/2002 | Meushaw et al. | 713/201 |
| 2005/0080982 | A1 * | 4/2005 | Vasilevsky et al. | 711/1 |
| 2005/0120160 | A1 * | 6/2005 | Plouffe et al. | 711/1 |
| 2007/0050849 | A1 * | 3/2007 | Takashima | 726/26 |
| 2008/0040491 | A1 * | 2/2008 | Minodier et al. | 709/229 |
| 2009/0241110 | A1 * | 9/2009 | Heo et al. | 718/1 |
| 2010/0107163 | A1 * | 4/2010 | Lee | 718/1 |
| 2010/0274886 | A1 * | 10/2010 | Nahum et al. | 709/224 |
| 2011/0295967 | A1 * | 12/2011 | Wang et al. | 709/212 |
| 2011/0296440 | A1 * | 12/2011 | Laurich et al. | 719/326 |
| 2012/0059876 | A1 * | 3/2012 | Chinta et al. | 709/203 |

FOREIGN PATENT DOCUMENTS

| | | |
|---|---|---|
| KR | 1020070010023 | 1/2007 |
| KR | 1020070058390 | 6/2007 |
| KR | 1020070111603 | 11/2007 |
| KR | 1020090027946 | 3/2009 |

* cited by examiner

*Primary Examiner* — Jeffery Williams
(74) *Attorney, Agent, or Firm* — Bacon & Thomas, PLLC

(57) ABSTRACT

A system for logically separating a server using client virtualization includes a client terminal including a virtual environment generation unit for generating a virtual environment, and a virtualized server including a local storage unit, an authentication server for performing authentication on the client terminal when a request for access to the local storage unit is received from a process executed in the virtual environment, and a virtualization filter drier for allowing or blocking the access request to the local storage unit based on the authentication result of the client terminal. The client terminal further includes a virtualization filter driver for transmitting the access request from the process executed in the virtual environment to the local storage unit, and blocking the access request from the process without being made through the virtual environment to the local storage unit.

10 Claims, 4 Drawing Sheets

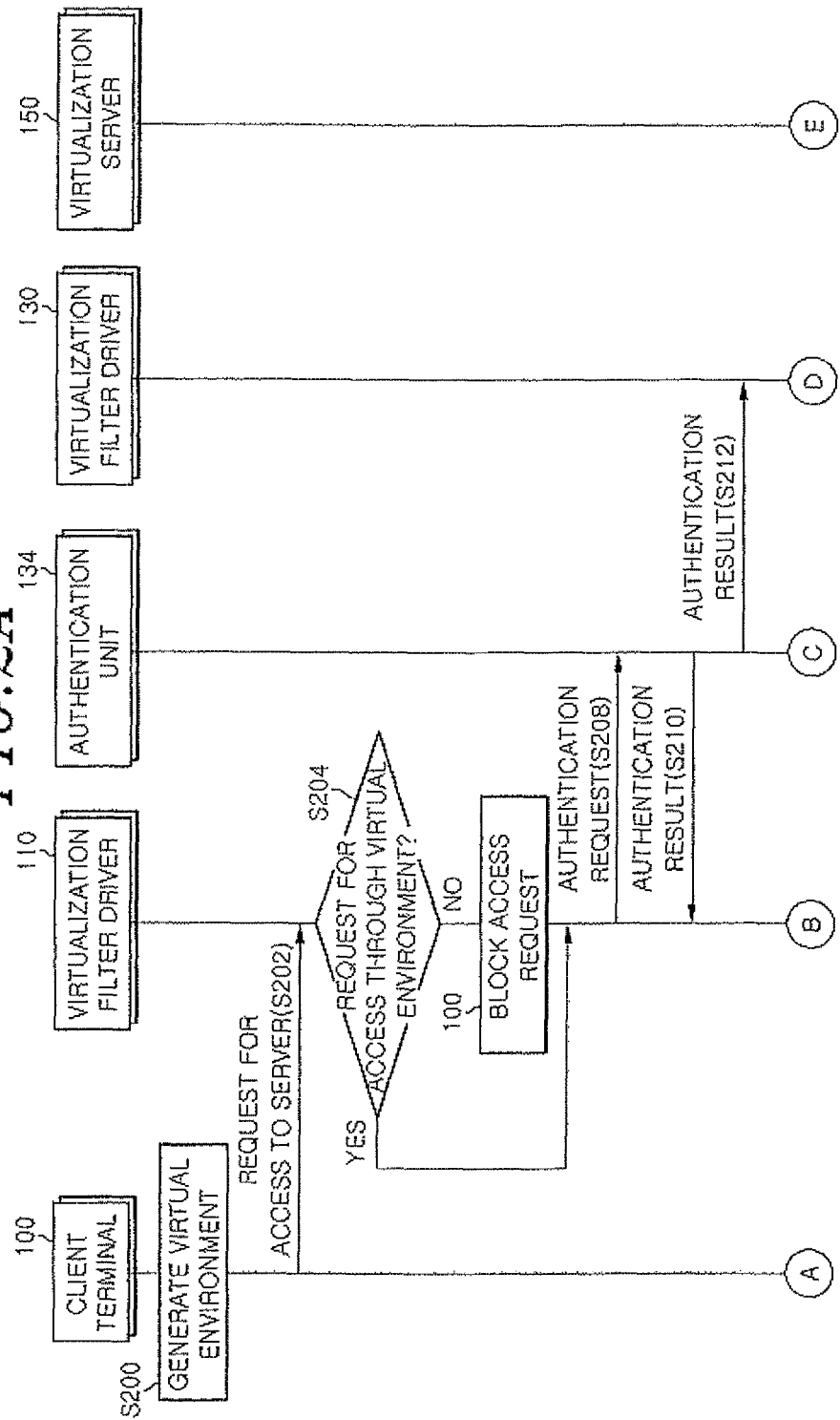

SYSTEM AND METHOD FOR LOGICAL SEPARATION OF A SERVER BY USING CLIENT VIRTUALIZATION

FIELD OF THE INVENTION

The present invention relates to a network separation system, and more particularly, to a system and method in a computer network system including multiple client terminals and a virtualized server for logically separating the virtualized server using client virtualization, which are capable of more effectively protecting the virtualized server by allowing an authenticated client terminal to access the virtualized server through only a virtualization environment.

BACKGROUND OF THE INVENTION

In recent years, with the rapid development of computer and communication technologies, the extensive use of computers and computer networks has become possible. Thus, public organizations, companies or the like use not only internal networks but also external networks such as the Internet to manage business related information or the like and transmit files or the like to the inside or outside.

However, since the external networks such as the Internet are vulnerable to external attacks, public organizations and companies deploy and operate supplementary firewalls to secure important internal information. Although the firewalls are installed, it is impossible to completely protect important internal information against intentional external attacks because they cannot prevent accesses which bypass them.

Thus, recently, a network separation technology has been introduced that separates an internal network and an external network from each other, thereby attempting to protect important internal information against attacks made over the external network.

The network separation technology refers to a technology that organizes two or more networks that have been separated for the purpose and prevents network packet data from being transferred between the networks. Therefore, the network separation technology prevents one network from being damaged even when the other network has been infiltrated by hacking or the like. The prior art related to the network separation technology is disclosed in Korean Unexamined Patent Publication No. 2007-111603 (published on Nov. 22, 2007).

The network separation technique described above may include logically separating a server that stores important information, from among a plurality of servers existing in the same internal network, as if it exists in a different network, and puts in practice the separated server.

However, most of network separation techniques are merely related to methods for selectively restricting a client terminal from accessing a server through authentication in a network in which the client terminal and the server coexist, rather than related to a concept of separating the server from a particular network.

With such conventional methods, a method for authenticating the client by the server needs to be provided and the client requires of creating authentication information. Thus, the conventional methods may not be globally applied to general clients and a general server.

SUMMARY OF THE INVENTION

In view of the above, the present invention provides a system and method in a computer network system including multiple client terminals and a server for logically separating the server using client virtualization, which virtualizes the server and allows an authorized client terminal to access the virtualized server through only a virtualization environment, thereby more effectively protecting the virtualized server.

In accordance with an aspect of the present invention, there is provided a system for logically separating a server using client virtualization, the system including: a client terminal including a virtual environment generation unit configured to generate a virtual environment; and a virtualized server including a local storage unit, an authentication server configured to perform authentication on the client terminal when a request for access to the local storage unit is received from a process executed in the virtual environment, and a server side virtualization filter drier configured to allow or block an access to the local storage unit based on the authentication result of the client terminal.

In accordance with another aspect of the present invention, there is provided a method in a computer network system comprising a client terminal and a virtualized server for logically separating the virtualized server using client virtualization, the client terminal including a client side virtualization filter driver and the virtualized server including a server side virtualization filter driver, the method including: receiving, by the client side virtualization filter driver, a request for access to the virtualized server on a network from a process executed in the client terminal; when the access request is received through a virtual environment, performing authentication on the client terminal and transmitting the access request to the server side virtualization filter driver; checking, by the server side virtualization filter driver, an authentication result with respect to the client terminal; and when the authentication result is checked, allowing the process to access the virtualized server.

In accordance with the present invention, in a computer network system including multiple client terminals and a virtualized server, a client terminal is allowed to access through only a virtual environment. When the client terminal requests to access the virtualized server, the client terminal is subjected to an authentication before being transmitted the access request to the virtualized server. Further, upon receiving the access request at the virtualized server, the virtualized server checks authentication information regarding the client terminal again to allow only an authorized client terminal to access the virtualized server. Accordingly, by help of the logical separation of the server using virtualization, the virtualized server may be more effectively protected against an unauthorized client terminal to access thereto.

BRIEF DESCRIPTION OF THE DRAWINGS

FIGS. 2A and 2B are flowcharts illustrating a controlling operation for logically separating a server in accordance with an embodiment of the present invention.

DETAILED DESCRIPTION OF THE EMBODIMENTS

Hereinafter, the operating principles of the present invention will be described in detail below with reference to the accompanying drawings. In the following description, well-known functions or constitutions will not be described in detail if they would obscure the invention in unnecessary detail. Further, the terminologies to be described below are defined in consideration of functions in the invention and may vary depending on a user's or operator's intention or practice.

Figure 1:
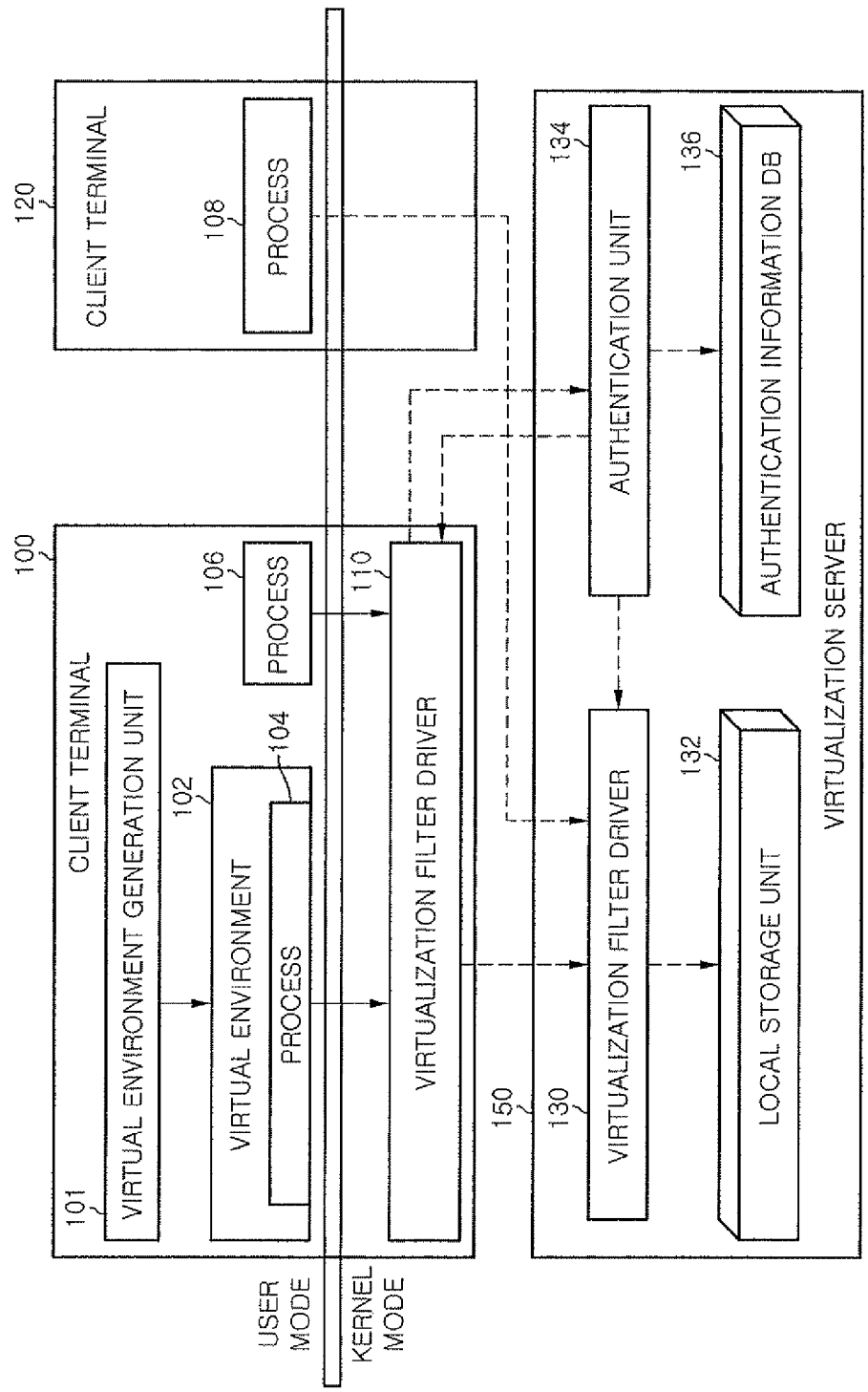
FIG. 1 is a block diagram of a system for logically separating a server using client virtualization in accordance with an embodiment of the present invention.

FIG. 1 illustrates a block diagram of a system for logically separating a server using client virtualization in accordance with an embodiment of the present invention.

Referring to FIG. 1, the system in accordance with the present invention includes a client terminal 100 having a virtualization filter driver 110 and a virtualized server 150. The client terminal 100 includes a virtual environment generation unit 101 and a virtualization filter driver 110, and the virtualized server 150 includes a virtualization filter driver 130, a local storage unit 132, an authentication server 134, and an authentication information DB 136.

A virtual environment 102 is generated by a virtualization environment generation unit 101 within the client terminal 100 and is driven in a user mode of the client terminal 100. The virtual environment serves as a tool for allowing the client terminal 100 to access a virtualized server 150 implemented in an internal network such as intranet or the like. The virtual environment 102 logically separates the virtualized server 150 that the processes 104 and 106 executed in the client terminal 100 want to access, as if the virtualized server 150 exists in a different network, thereby preventing the processes executed in the client terminal 100 to access the server 150 without any restriction.

In order for a user to access the virtualized server 150 through the client terminal 100, the user needs to generate the virtual environment 102 by the virtual environment generation unit 101 and execute the process 104 such as an Explorer or the like which is able to access the virtualized server 150 within the generated virtual environment 102. If the process 106 such as an Explorer is executed in a state in which the virtual environment 102 is not generated, the virtualized server 150 does not appear on, for example, the Explorer, making it impossible to access the virtualized server 150.

The virtualization filter driver 110 is a server access control driver driven in a kernel mode of the client terminal 100, which performs filtering on access to the virtualized server 150 with respect to all the processes 104 and 106 executed in the client terminal 100.

Specifically, when the process 104 or 106 requesting access to the virtualized server 150 on a network is executed in the client terminal 100, the virtualization filter driver 110 checks whether or not the process 104 or 106 has been executed through the virtual environment 102 or without going through the virtual environment 102. The virtualization filter driver 110 then transmits only a server access request from the process 104 executed in the virtual environment 102 of the client terminal 100 to the server 150 on the network through authentication of the client terminal 100 and however, blocks an access request from the process 106 without going through the virtual environment 102.

The authentication process will be described in more detail. When access to the virtualized server 150 is requested from the process 104 executed in the virtual environment 102 of the client terminal 100, the virtualization filter driver 110 requests the authentication server 134 to authenticate whether or not the client terminal 100 has authority to access the server 150.

Here, the authentication server 134 includes the authentication information DB 136 which stores authentication information for checking whether or not the client terminals 100 and 120 have authority to access a server. In this embodiment, the authentication server 134 is implemented as part of the virtualized server 150, but it may be implemented as a separate independent server which is separated from the client terminal 100 and the virtualized server 150.

In response to the authentication request, the authentication server 134 searches the authentication information DB 136 to perform authentication on the client terminal, and transmits an authentication result to the virtualization filter driver 110.

If the client terminal 100 is normally authenticated by the authentication server 134, the virtualization filter driver 110 transmits the server access request from the process 104 to the virtualized server 150, and if the authentication is not normally performed, the virtualization filter driver 110 blocks the server access request from the process 104. Therefore, an indiscriminate access to the server 150 which stores important information from an unauthenticated client terminal 100 is blocked, thereby safely protecting the virtualized server 150.

The authentication server 134 transmits the result of authentication performed on the client terminal 100 to the virtualization filter driver 130 as well as to the virtualization filter driver 110.

In response to the access request received from the virtualization filter driver 110, the virtualization filter driver 130 that has been received the authentication result regarding the client terminal 100 from the authentication server 134 permits or blocks access of the client terminal 100 to the virtualized server 150.

That is, when the virtualization filter driver 130 receives a server access request from the virtualization filter driver 110, the virtualization filter driver 130 checks an authentication result of the client terminal 100 previously provided after performing authentication from the authentication server 134.

When it is checked that the client terminal 110 has been normally authenticated, the virtualization filter driver 130 allows access of the client terminal 100 to the server so that the client terminal 100 can access the local storage unit 132 provided in the virtualized server 150.

However, when it is checked that the client terminal 110 has not been normally authenticated, the virtualization filter driver 130 regards the client terminal 100 as not having authority to access the virtualized server, and blocks access of the client terminal 100 to the virtualized server.

Figure 2B:
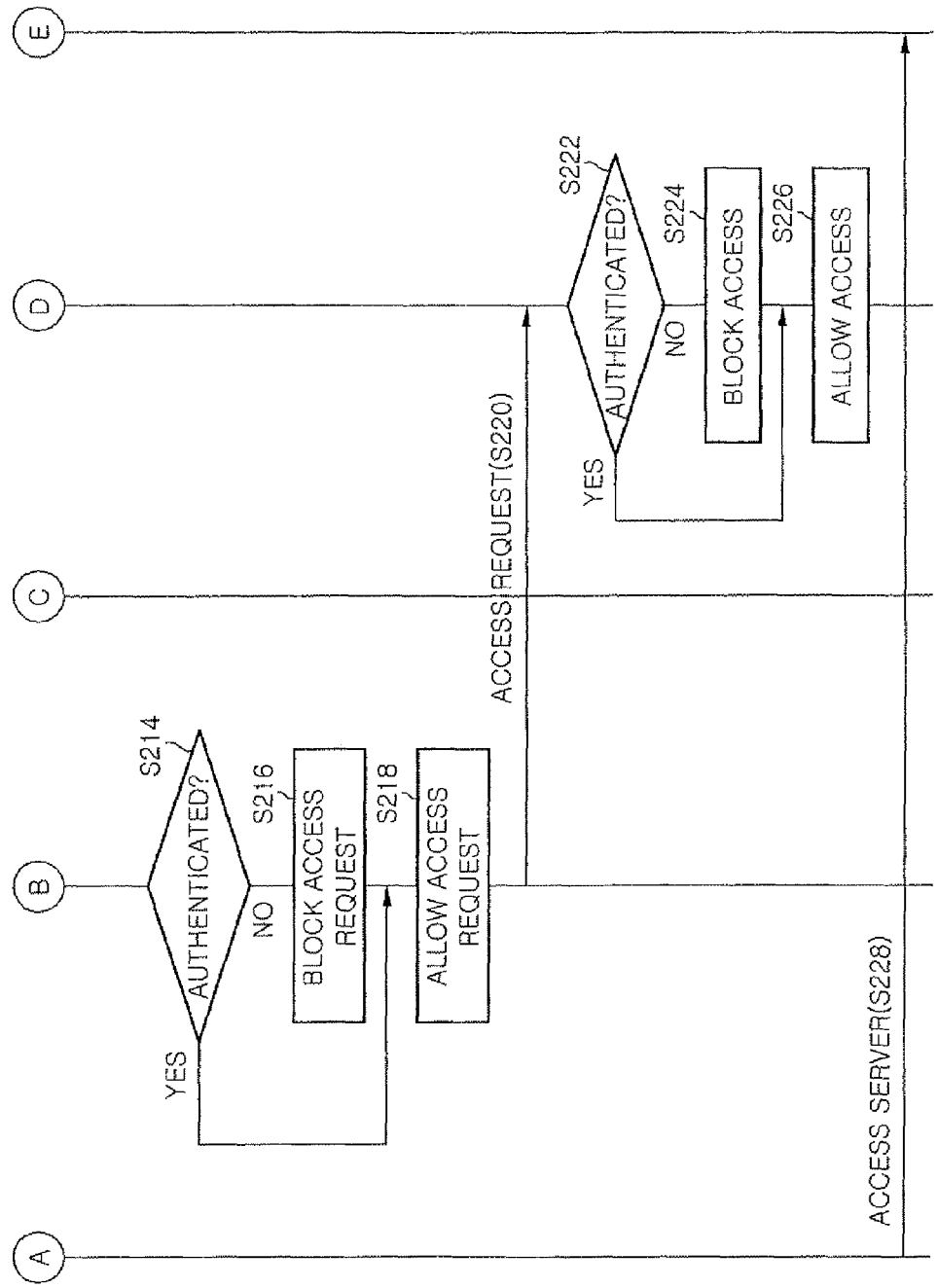

FIGS. 2A and 2B are flowcharts illustrating a control flow in the system for logically separating a server using client virtualization in accordance with an embodiment of the present invention. Hereinafter, the embodiment of the present invention will be described in detail with reference to FIGS. 1 and 2A and 2B.

First, when a user wants to access the virtualized server 150 by using the client terminal 100 connected to the virtualized server 150 via a network, the user generates a virtual environment in the client terminal 100 in step S200, and executes the process 104 such as an Explorer, which is able to access the server 150 in the virtual environment, to a request for access to the virtualized server 150 in step S202.

In this case, the request for access to the virtualized server 150 is performed by executing the process 104 which is able to access the virtualized server 150, and transmitted to the virtualization filter driver 110. The virtualization filter driver 110, which is a server access control driver driven in the kernel mode of the client terminal 100, performs filtering on access to the virtualized server 15 with respect to all the processes 104 and 106 executed in the client terminal 100.

Upon receiving the request for access to the virtualized server 150, the virtualization filter driver 110 checks whether or not the process 104 has been executed in the virtual environment 102 or has been executed without being made through the virtual environment 102 in step S204. The virtualization filter driver 110 blocks a request for access to the virtualized server 150 from the process 106 which does not made through the virtual environment 102 in step S206.

Depending on the check result, when it is determined that the process 104, which has requested access to the virtualized server 150, has been executed in the virtual environment 102, the virtualization filter driver 110 requests the authentication server 134 to authenticate the client terminal 100 whether or not the client terminal 100 has authority to access the virtualized server 150 in step S208.

Thus, the authentication server 134 authenticates whether or not the client terminal 100 requested for authentication has authority to access the virtualization server 150, and then transmits the authentication result to the virtualization filter driver 110 in step S210. In this case, the authentication result is also transmitted to the virtualization filter driver 130 in step S212.

Here, the authentication server 134 may be implemented as part of the virtualized server 150 or may be implemented as a separate independent server which is separated from the client terminal 100 and the virtualized server 150.

The virtualization filter driver 110 checks the authentication result for the client terminal 100 transmitted from the authentication server 134 in step S214. If the authentication has not been normally performed, the virtualization filter driver 110 blocks the server access request from the process 104 in step S216. If, however, the authentication has been normally performed on the client terminal 100, the virtualization filter driver 110 allows the server access request from the process 104 in step S218, and transmits the server access request to the virtualized server 150 on the network in step S220.

The server access request transmitted to the virtualized server 150 on the network is received by the virtualization filter driver 130.

The virtualization filter driver 130 checks the authority of the client terminal 100 to access the virtualized server again by using the authentication result provided from the authentication server 134.

That is, the virtualization filter driver 130 checks the authentication result for the client terminal 100 which has requested access to the virtualized server provided from the authentication server 134 in step S222. If the client terminal 100 is identified as a terminal which has not been normally authenticated and thus it does not have authority to access, the virtualization filter driver 130 blocks the client terminal 100's access to the virtualized server in step S224.

However, if the client terminal 100 is identified as a terminal which has been normally authenticated, the virtualization filter driver 130 allows the client terminal 100's access to the virtualized server in step S226 and then allows the client terminal 100 to access the local storage unit 132 provided in the server 150.

Accordingly, the client terminal 100 accesses the virtualized server 150 in step S228 so that the client terminal can use, for example, required information from information stored in the local storage unit 132 of the virtualized server 150.

Figure 3:
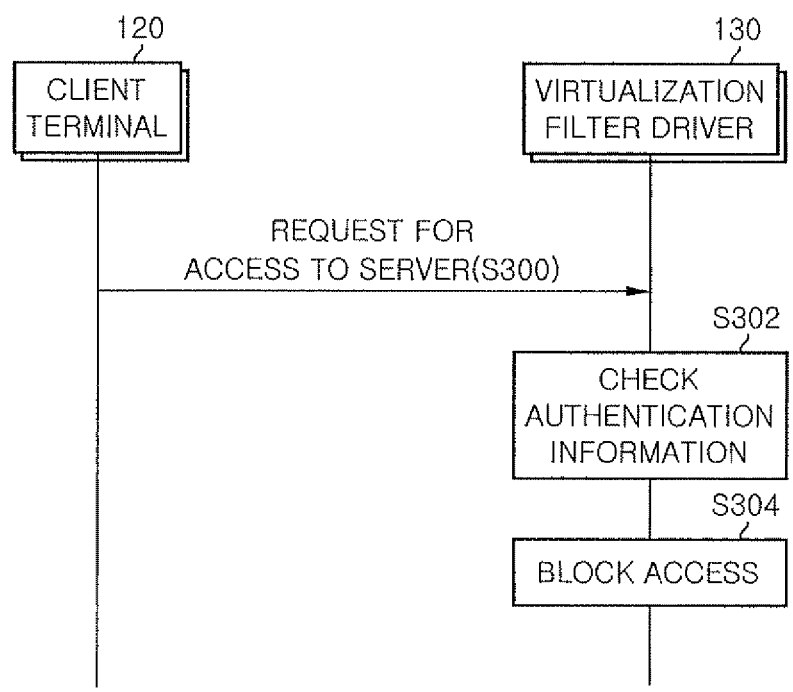
FIG. 3 is a flowchart illustrating a controlling operation for logically separating a server in accordance with another embodiment of the present invention.

FIG. 3 is a flowchart illustrating a control flow for blocking access to a server from a client terminal without a virtualization filter driver in a logical separation system of the server using client virtualization in accordance with an embodiment of the present invention. Hereinafter, the embodiment of the present invention will be described in detail with reference to FIGS. 1 and 3.

First, when the process 108 attempting access to a server is executed by the client terminal 120 in which the virtualization filter driver 110 is not installed, the server access request from the process 108 is directly received by the virtualization filter driver 130 of the virtualized server 150 on the network, without passing through the virtualization filter driver 110 in step S300.

The virtualization filter driver 130 checks whether or not there is an authentication result with respect to the client terminal 120 which has requested access to the virtualized server in step S302. In this case, since the client terminal 120 has directly requested access to the virtualized server without the virtualization filter driver 110 installed therein, the authentication result with respect to the client terminal 120 do not exist in the virtualization filter driver 130.

Thus, the virtualization filter driver 130 determines that the client terminal 120, which has not passed through the virtualization filter driver 110, does not have authority to access the virtualized server, and thus blocks the access to the virtualized server in step S304.

In this embodiment, it is understood that requests for access to the virtualized server 150 from processes executed in the client terminals 100 and 120 is considered to be the same as the request for access to the local storage unit 132 provided in the virtualized server.

Embodiments of the present invention implement a logical separation of a server using client virtualization in a computer network system including multiple client terminals and the server wherein the server is virtualized and may be accessed through only a virtual environment of the client terminal. When a process executed in the virtual environment of the client terminal intends to access the server, a virtualization filter driver installed in the client terminal receives information regarding whether or not the client terminal has authority to access the server from an authentication server, and then transmits the access request to the server. The transmitted access request is received by a virtualization filter driver installed in the virtualized server. The virtualization filter driver of the virtualized server checks authentication information regarding the client terminal again through the authentication server and allows only an authorized client terminal having proper authority to access the server. Therefore, by logically separating the server using virtualization, the server may be more effectively protected against an unauthorized client terminal to access.

While the invention has been shown and described with respect to the embodiments, the present invention is not limited thereto. It will be understood by those skilled in the art that various changes and modifications may be made without departing from the scope of the invention as defined in the following claims.

What is claimed is:

1. A system for logically separating a server using client virtualization, the system comprising:
    a client terminal including a virtual environment generation unit program configured to generate a virtual environment; and
    a virtualized server including:
        a local storage unit;
        an authentication server configured to perform authentication on the client terminal when a request for access to the local storage unit is received from a process executed in the virtual environment; and
        a server side virtualization filter driver software configured to allow or block an access to the local storage unit based on the authentication result of the client terminal.

2. The system of claim 1, wherein the client terminal further includes a client side virtualization filter driver software configured to transmit the request for access to the local storage unit from the process executed in the virtual environment of the client terminal to the virtualized server, and block a request for access to the local storage unit from a process which has not passed through the virtual environment.

3. The system of claim 2, wherein when the client side virtualization filter driver software is configured to receive the request for access to the local storage unit from the process executed in the virtual environment, the client side virtualization filter driver software is configured to request the authentication server to authenticate the client terminal, and when the client terminal has been normally authenticated based on the authentication result transmitted from the authentication server, the client side virtualization filter driver software is configured to transmit the request for access to the local storage unit to the server side virtualization filter driver software, while when the client terminal has not been normally authenticated, the client side virtualization filter driver software is configured to block the request for access to the local storage unit.

4. The system of claim 2, wherein the client side virtualization filter driver software is driven in a kernel mode of the client terminal.

5. The system of claim 2, wherein when the authentication server authenticates the client terminal, the authentication server is configured to provide the authentication result to the client side virtualization filter driver software and the server side virtualization filter driver software.

6. The system of claim 2, wherein when the server side virtualization filter driver software receives a request for access to the server from a client terminal without having the client side virtualization filter driver software installed therein, the server side virtualization filter driver software is configured to check the presence or absence of authentication result with respect to the client terminal to block the request for access to the server from the client terminal.

7. A method in a computer network system comprising a client terminal and a server for logically separating the server using client virtualization, the client terminal including a client side virtualization filter driver and the server including a server side virtualization filter driver, the method comprising:

receiving, by the client side virtualization filter driver, a request for access to a virtualized server on a network from a process executed in the client terminal;

when the access request is received through a virtual environment, performing authentication on the client terminal and transmitting the access request to the server side virtualization filter driver;

checking, by the server side virtualization filter driver, an authentication result with respect to the client terminal; and when the authentication result is checked, allowing the process to access the virtualized server.

8. The method of claim 7, wherein said transmitting the access request to the server side virtualization filter driver comprises:

checking, by the client side virtualization filter driver, whether the process has been executed in the virtual environment;

when the process has been executed in the virtual environment, performing authentication on the client terminal; and when the client terminal has been authenticated, transmitting the access request to the server side virtualization filter driver.

9. The method of claim 8, wherein said checking whether the process has been executed in the virtual environment comprises blocking, by the client side virtualization filter driver, the access request from the process when the process has not been executed in the virtual environment.

10. The method of claim 7, wherein said checking an authentication result with respect to the client terminal comprises blocking, by the server side virtualization filter driver, access to the server from the process when the client terminal has not been authenticated.

\* \* \* \* \*